United States Patent
Choi et al.

(10) Patent No.: US 11,190,762 B2
(45) Date of Patent: Nov. 30, 2021

(54) INTRA-PREDICTION MODE-BASED IMAGE PROCESSING METHOD AND APPARATUS THEREFOR

(71) Applicant: LG ELECTRONICS INC., Seoul (KR)

(72) Inventors: Jangwon Choi, Seoul (KR); Jaehyun Lim, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 41 days.

(21) Appl. No.: 16/625,975

(22) PCT Filed: Mar. 19, 2018

(86) PCT No.: PCT/KR2018/003192
§ 371 (c)(1),
(2) Date: Dec. 23, 2019

(87) PCT Pub. No.: WO2018/236028
PCT Pub. Date: Dec. 27, 2018

(65) Prior Publication Data
US 2020/0177878 A1 Jun. 4, 2020

Related U.S. Application Data

(60) Provisional application No. 62/522,711, filed on Jun. 21, 2017, provisional application No. 62/575,513, filed on Oct. 22, 2017.

(51) Int. Cl.
*H04N 19/11* (2014.01)
*H04N 19/119* (2014.01)
(Continued)

(52) U.S. Cl.
CPC .......... *H04N 19/11* (2014.11); *H04N 19/119* (2014.11); *H04N 19/159* (2014.11);
(Continued)

(58) Field of Classification Search
CPC .............................. H04N 19/11; H04N 19/119
See application file for complete search history.

(56) References Cited

U.S. PATENT DOCUMENTS

2013/0188696 A1* 7/2013 Liu ...................... H04N 19/593
375/240.12
2015/0016512 A1* 1/2015 Pu ........................ H04N 19/147
375/240.03

FOREIGN PATENT DOCUMENTS

KR  1020150035935 A   4/2015
KR  1020150060616 A   6/2016
(Continued)

*Primary Examiner* — Jerry T Jean Baptiste
(74) *Attorney, Agent, or Firm* — Dentons US LLP

(57) ABSTRACT

Disclosed are an intra-prediction mode-based image processing method and apparatus. In particular, the intra-prediction mode-based image processing method may comprise the steps of: generating a first prediction sample by performing spatial prediction on a current chroma block; determining whether or not a combined intra-prediction mode is applicable to the current chroma block; when the combined intra-prediction mode is applicable to the current chroma block, determining a component prediction mode used for inter-component prediction of the current chroma block; generating a second prediction sample by applying the determined component prediction mode to the current chroma block; and generating a final prediction sample of the current chroma block by using the first prediction sample and the second prediction sample.

14 Claims, 10 Drawing Sheets

(51) Int. Cl.
*H04N 19/159* (2014.01)
*H04N 19/176* (2014.01)
*H04N 19/186* (2014.01)
*H04N 19/593* (2014.01)

(52) U.S. Cl.
CPC ......... *H04N 19/176* (2014.11); *H04N 19/186* (2014.11); *H04N 19/593* (2014.11)

(56) References Cited

FOREIGN PATENT DOCUMENTS

| KR | 1020170020539 A | 2/2017 |
| WO | 2013002589 A2 | 3/2013 |
| WO | 2015008417 A1 | 1/2015 |

* cited by examiner

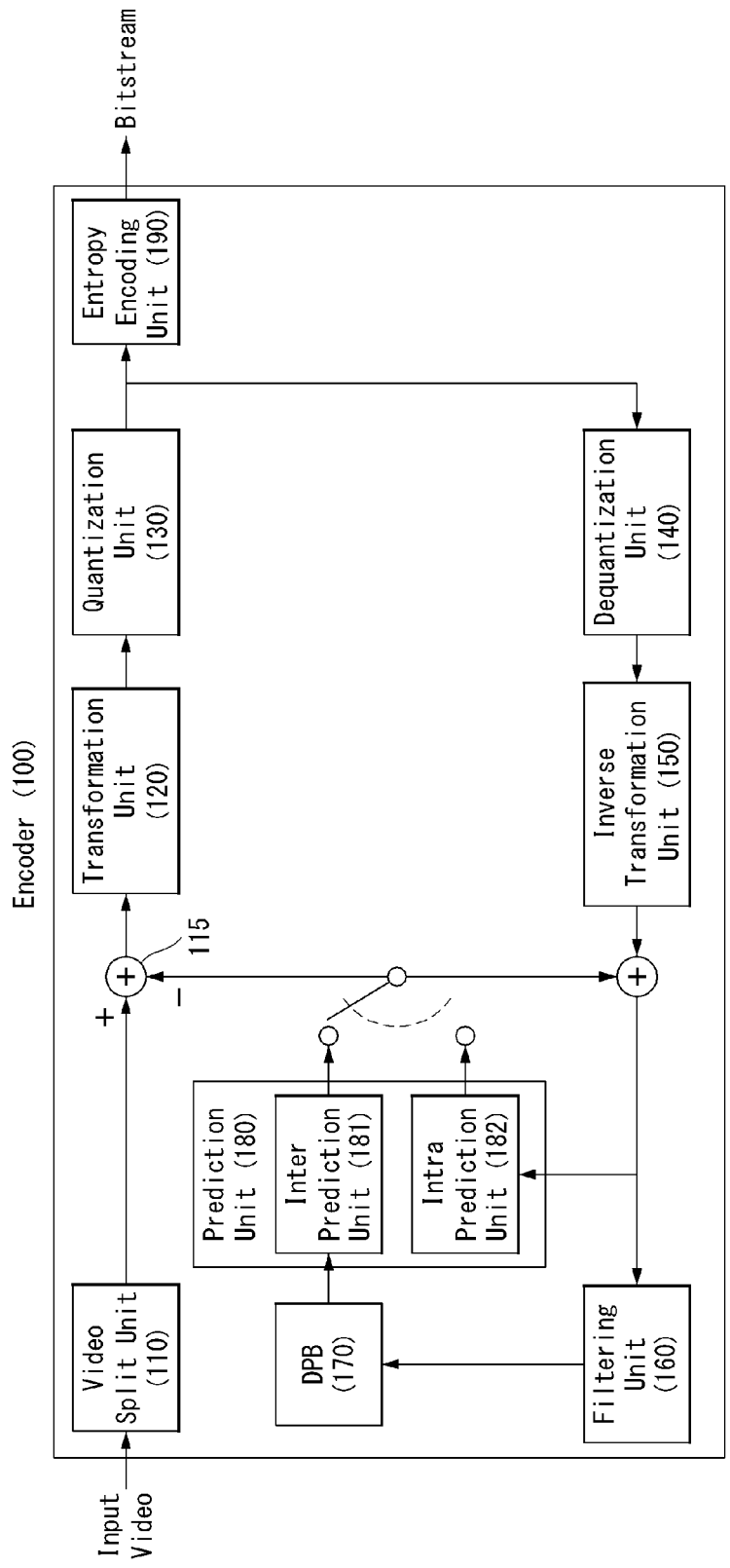
[FIG. 1]

[FIG. 2]
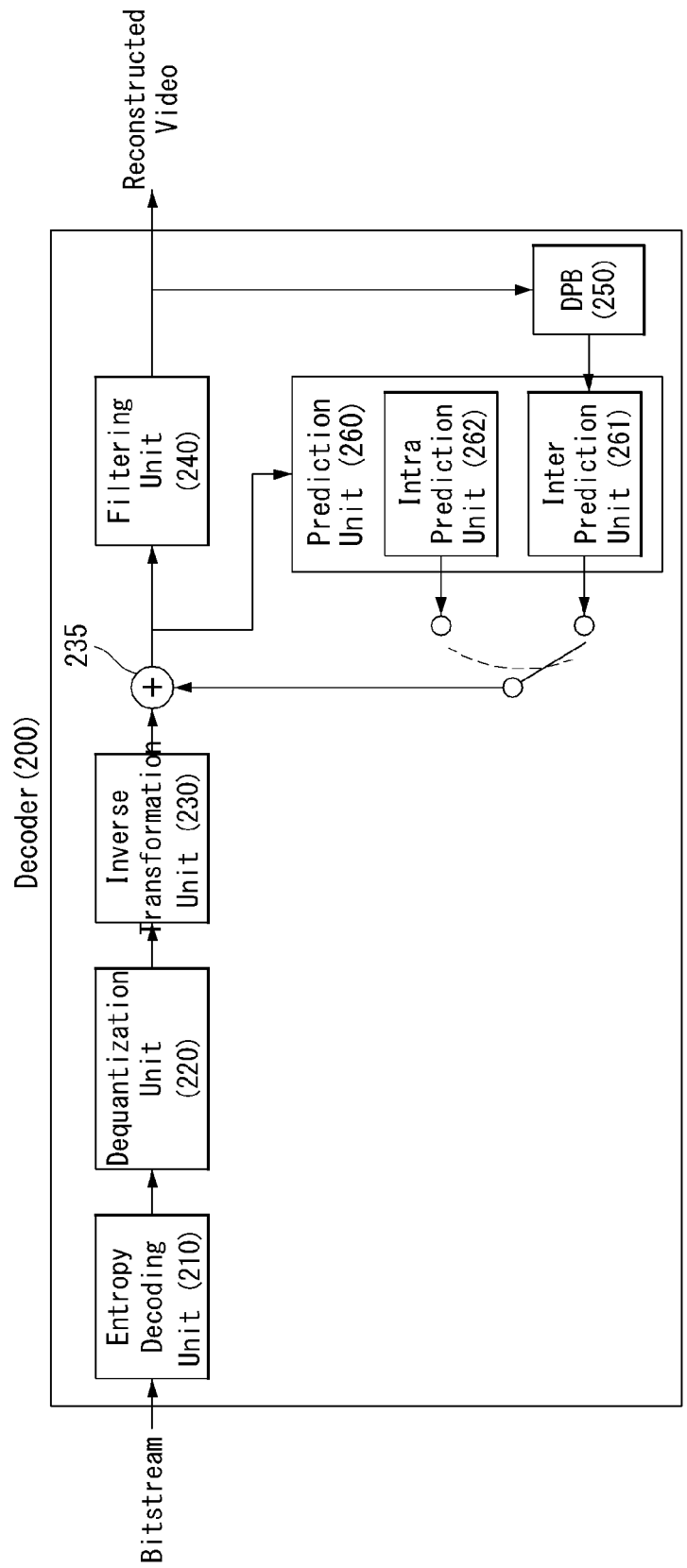

[FIG. 3]
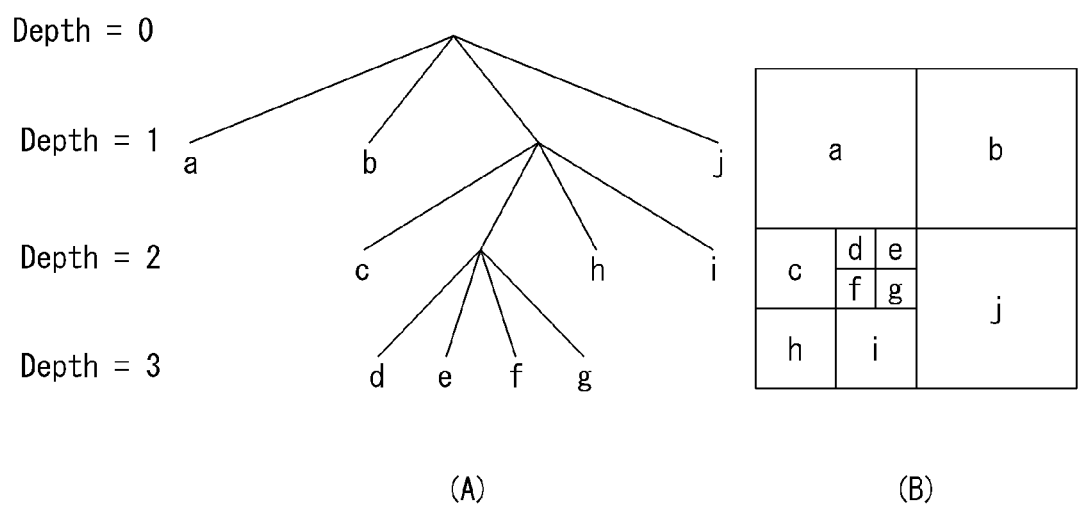

[FIG. 4]
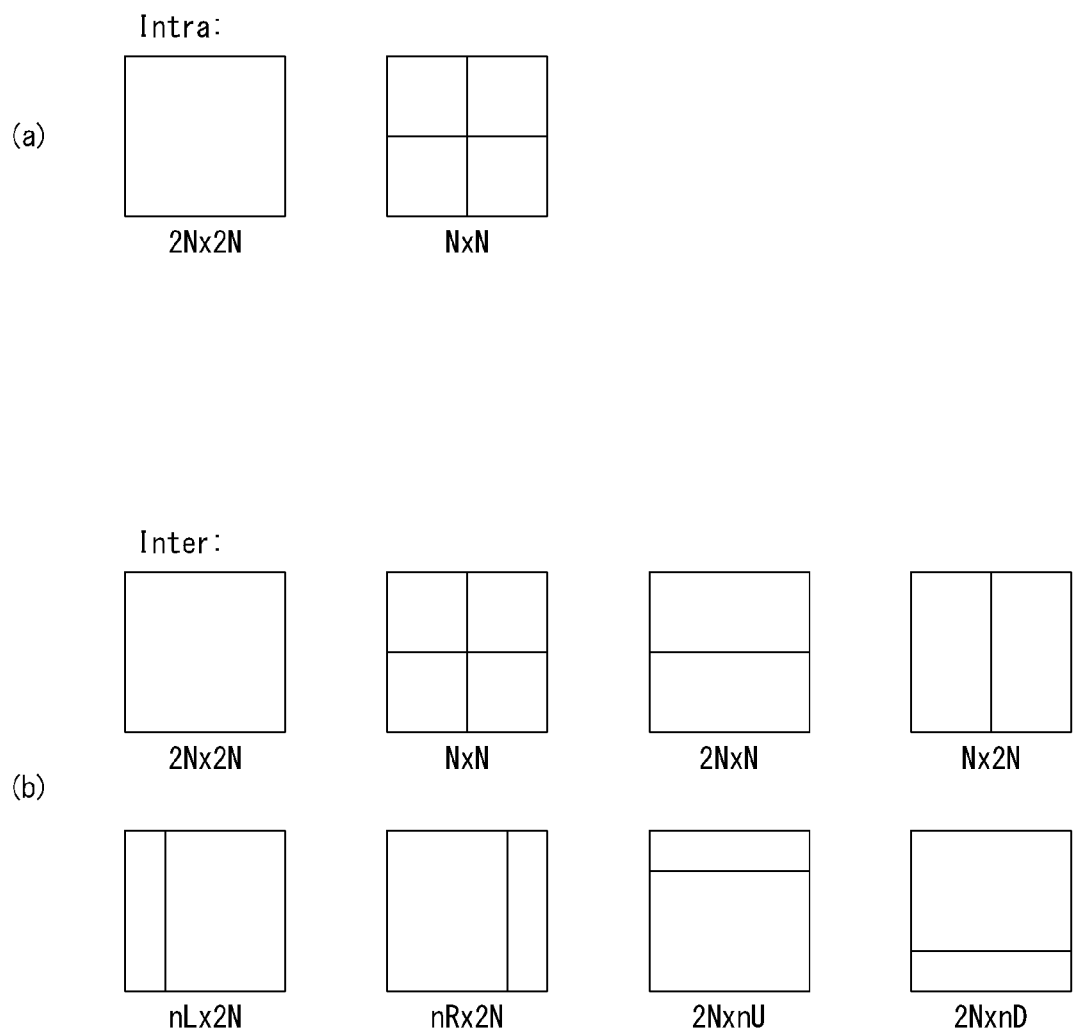

[FIG. 5]
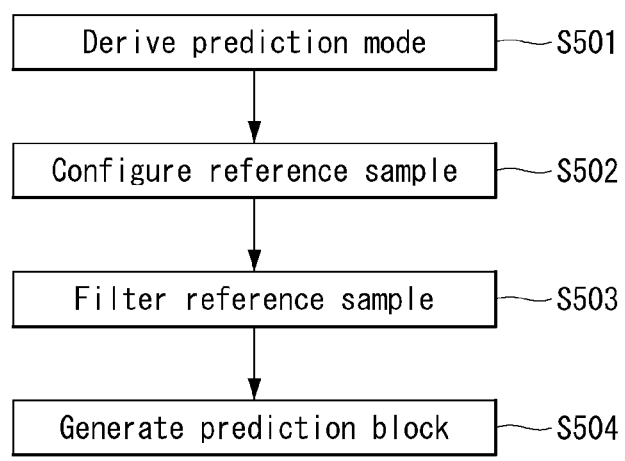

[FIG. 6]
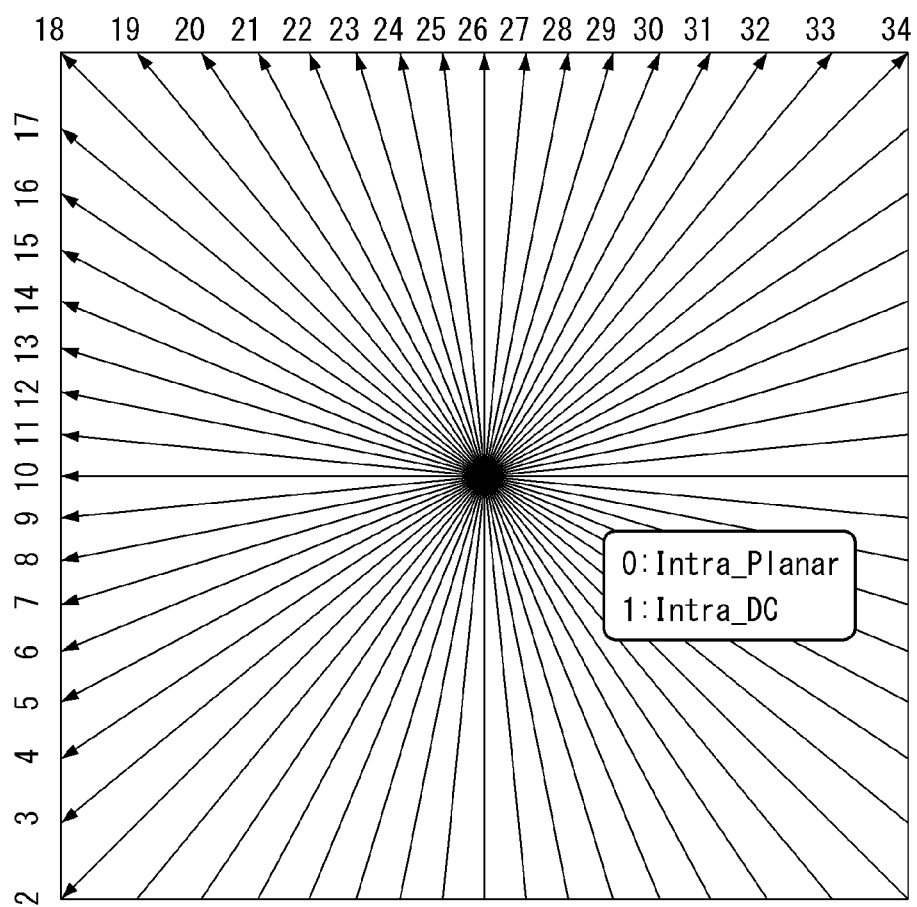

[FIG. 7]

$$\text{LAP predicted chroma block (701)} = \frac{1}{2} \times \text{CCLM predicted chroma block (702)} + \frac{1}{2} \times \text{angular predicted chroma block (703)}$$

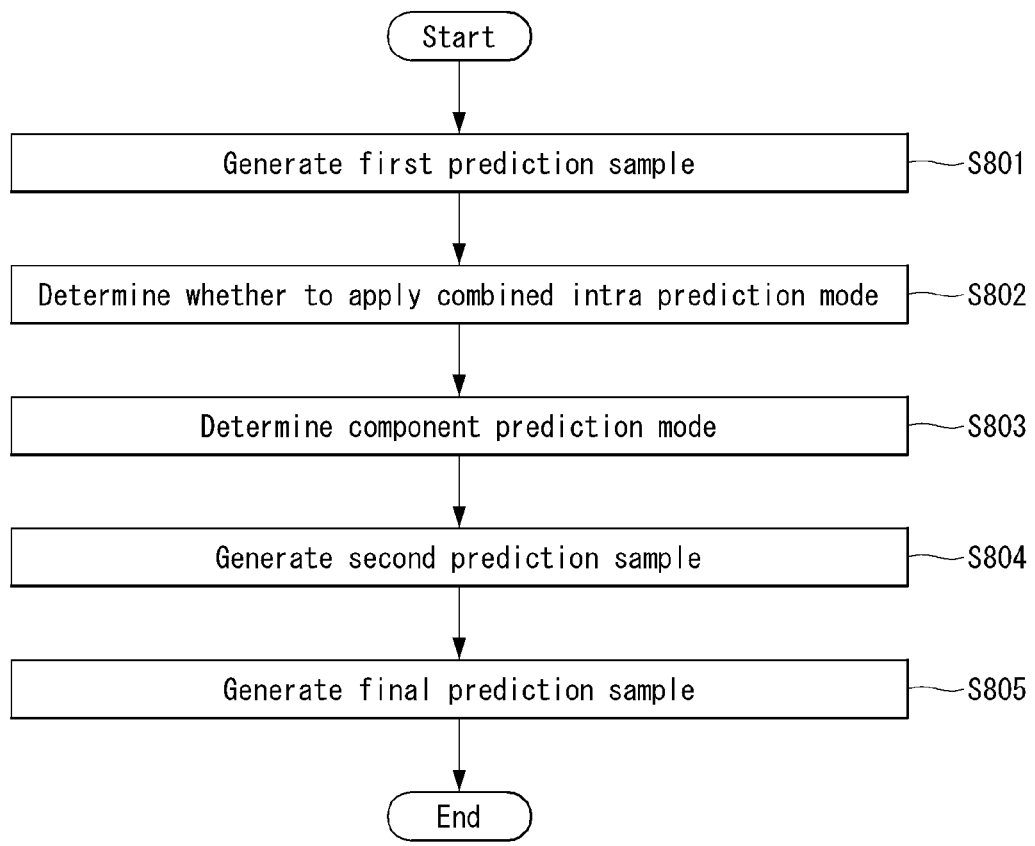
[FIG. 8]

[FIG. 9]
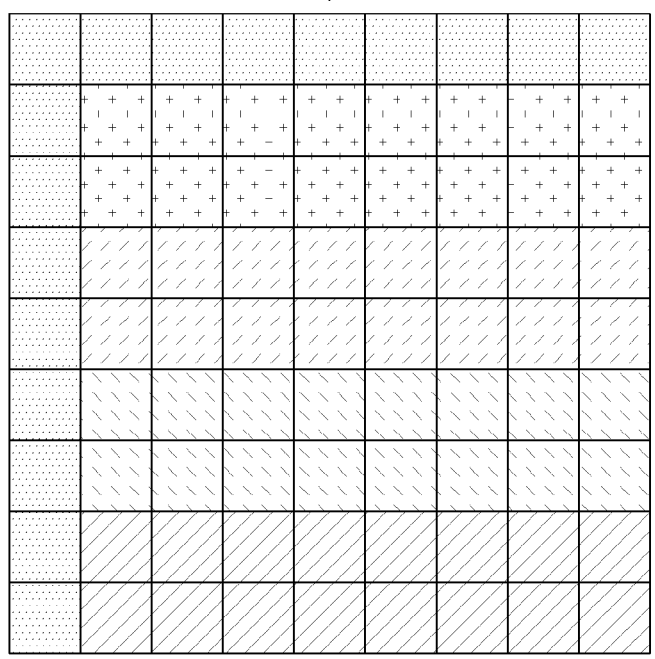

[FIG. 10]
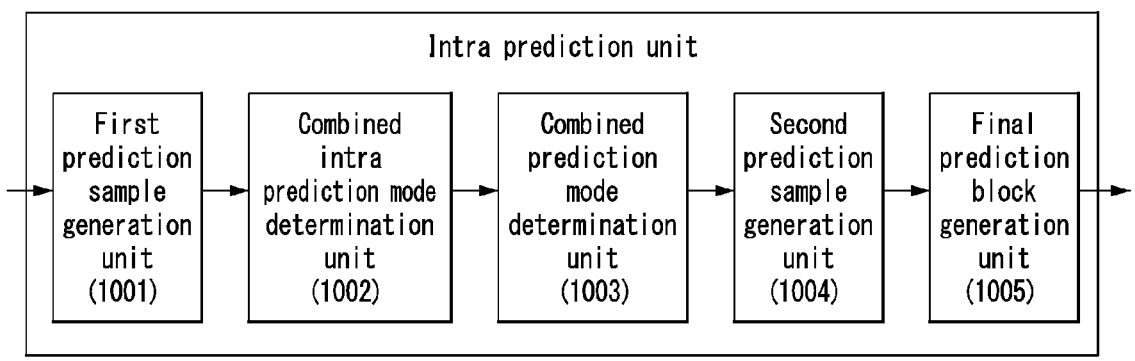

INTRA-PREDICTION MODE-BASED IMAGE PROCESSING METHOD AND APPARATUS THEREFOR

CROSS-REFERENCE TO RELATED APPLICATIONS

This application is the National Stage filing under 35 U.S.C. 371 of International Application No. PCT/KR2018/003192, filed on Jun. 19, 2018, which claims the benefit of U.S. Provisional Applications No. 62/522,711, filed on Jun. 21, 2017 and No. 62/575,513, filed on Oct. 22, 2017, the contents of which are all hereby incorporated by reference herein in their entirety.

TECHNICAL FIELD

The disclosure relates to a still image or moving image processing method and, more particularly, to a method of encoding/decoding a still image or moving image based on an intra-prediction mode and an apparatus supporting the same.

BACKGROUND ART

Compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

Next-generation video content is supposed to have the characteristics of high spatial resolution, high frame rate and high dimensionality of scene representation. In order to process such content, a drastic increase of a memory storage, memory access rate and processing power will be resulted.

Accordingly, it is required to design a coding tool for processing next-generation video content efficiently.

DISCLOSURE

Technical Problem

The disclosure proposes a method of improving a linear model angular prediction used for an intra prediction (or intra-frame prediction) encoding and decoding process for a chroma image.

Furthermore, the disclosure proposes a method of selecting a cross-component linear model used for a linear model angular prediction.

Furthermore, the disclosure proposes a method of applying a weight in generating a chroma prediction sample by applying a linear model angular prediction.

Furthermore, the disclosure proposes a method of adaptively determining a weigh used for the generation of a chroma prediction sample in a linear model angular prediction.

Technical objects to be achieved in the disclosure are not limited to the above-described technical objects, and other technical objects not described above may be evidently understood by a person having ordinary skill in the art to which the disclosure pertains from the following description.

Technical Solution

In an aspect of the disclosure, a method of processing an image based on an intra prediction mode may include determining whether a combined intra prediction mode is applied to a current chroma block, wherein the combined intra prediction mode indicates a prediction mode in which a spatial prediction method and an inter component prediction method have been combined; generating a first prediction sample by performing a spatial prediction on the current chroma block when the combined intra prediction mode is applied to the current chroma block; determining a component prediction mode used for an inter component prediction of the current chroma block, wherein the component prediction mode indicates a prediction mode for generating a prediction sample of a chroma component using a sample value of a luma component; generating a second prediction sample by applying the determined component prediction mode to the current chroma block; and generating a final prediction sample of the current chroma block using the first prediction sample and the second prediction sample.

Preferably, determining the component prediction mode may include determining the component prediction mode among a first prediction mode using one linear model or a second prediction mode using a plurality of linear models.

Preferably, generating the second prediction sample may include generating the second prediction sample using a reconstructed sample of a luma block corresponding to the current chroma block when the determined component prediction mode is the first prediction mode.

Preferably, generating the second prediction sample may include classifying reconstructed samples of a luma block, corresponding to the current chroma block, into two groups when the determined component prediction mode is the second prediction mode. The second prediction sample may be generated using a reconstructed sample of a luma block corresponding to the current chroma block in the classified group unit.

Preferably, classifying the reconstructed samples into the two groups may include deriving a threshold using neighbor samples of a luma block corresponding to the current chroma block. The reconstructed samples of the luma block may be classified into the two groups based on the derived threshold.

Preferably, determining the component prediction mode may include extracting an index indicating a specific mode among the first prediction mode or the second prediction mode.

Preferably, extracting the index indicating the specific mode may include identifying whether the current chroma block is greater than a predetermined size. The index indicating the specific mode may be extracted when the current chroma block is greater than the predetermined size as a result of the identification.

Preferably, determining whether the combined intra prediction mode is applied may include extracting a combined intra prediction flag indicating whether the combined intra prediction mode is applied to the current chroma block. A plurality of context models may be assigned to the combined intra prediction flag.

Preferably, a context model of the combined intra prediction flag may be determined based on whether the combined intra prediction mode is applied to a block neighboring the current chroma block.

Preferably, generating the final prediction sample may include generating the final prediction sample by applying predetermined weights to the first prediction sample and the second prediction sample.

Preferably, generating the final prediction sample may include determining a weight applied to each of the first prediction sample and the second prediction sample. The final prediction sample may be generated by applying the determined weights to the first prediction sample and the second prediction sample.

Preferably, generating the final prediction sample may include extracting an index indicating a specific weight among a plurality of predetermined weights.

Preferably, the weights applied to the first prediction sample and the second prediction sample may be determined based on a prediction direction of a prediction mode used for the spatial prediction and a distance between a reference sample neighboring the current chroma block and a sample within the current chroma block.

In another aspect of the disclosure, an apparatus for processing an image based on an intra prediction mode may include a combined intra prediction mode determination unit configured to determine whether a combined intra prediction mode is applied to a current chroma block, wherein the combined intra prediction mode indicates a prediction mode in which a spatial prediction method and an inter component prediction method have been combined; a first prediction sample generation unit configured to generate a first prediction sample by performing a spatial prediction on the current chroma block when the combined intra prediction mode is applied to the current chroma block; a component prediction mode determination unit configured to determine a component prediction mode used for an inter component prediction of the current chroma block, wherein the component prediction mode indicates a prediction mode for generating a prediction sample of a chroma component using a sample value of a luma component; a second prediction sample generation unit configured to generate a second prediction sample by applying the determined component prediction mode to the current chroma block; and a final prediction sample generation unit configured to generate a final prediction sample of the current chroma block using the first prediction sample and the second prediction sample.

Advantageous Effects

According to an embodiment of the disclosure, encoding efficiency of a chroma image can be improved by efficiently improving a linear model angular prediction.

Effects which may be obtained in the disclosure are not limited to the aforementioned effects, and other technical effects not described above may be evidently understood by a person having ordinary skill in the art to which the disclosure pertains from the following description.

DESCRIPTION OF DRAWINGS

The accompanying drawings, which are included herein as a part of the description for help understanding the disclosure, provide embodiments of the disclosure, and describe the technical features of the disclosure with the description below.

FIG. 1 is an embodiment to which the disclosure is applied, and shows a schematic block diagram of an encoder in which the encoding of a still image or moving image signal is performed.

FIG. 2 is an embodiment to which the disclosure is applied, and shows a schematic block diagram of a decoder in which the encoding of a still image or moving image signal is performed.

FIG. 3 is a diagram for illustrating the split structure of a coding unit to which the disclosure may be applied.

FIG. 4 is a diagram for illustrating a prediction unit to which the disclosure may be applied.

FIG. 5 is an embodiment to which the disclosure is applied and is a diagram illustrating an intra-prediction method.

FIG. 6 illustrates prediction directions according to intra-prediction modes.

FIG. 7 is an embodiment to which the disclosure is applied and is a diagram for describing a method of generating a prediction block of a chroma block using a linear model angular prediction method.

FIG. 8 is an embodiment to which the disclosure may be applied and is a diagram illustrating a method of configuring a most probable mode (MPM).

FIG. 9 is an embodiment to which the disclosure is applied and is a diagram illustrating a method of adaptively determining a weight, applied to a linear model angular prediction method, based on a distance between a prediction sample and a reference sample.

FIG. 10 is a diagram more specifically illustrating an intra prediction unit according to an embodiment of the disclosure.

MODE FOR INVENTION

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a frame, a block, etc may be properly replaced and interpreted in each coding process.

Hereinafter, in this disclosure, a "block" or "unit" means a unit by which an encoding/decoding process, such as a prediction, a transform and/or quantization, is performed, and may be configured as a multi-dimension array of samples (or picture elements or pixels).

A "block" or "unit" may mean a multi-dimension array of samples for a luma component, and may mean a multi-dimension array of samples for a chroma component. Furthermore, a "block" or "unit" may generally refer to both a multi-dimension array of samples for a luma component and a multi-dimension array of samples for a chroma component.

For example, a "block" or "unit" may be interpreted as a meaning, including all of a coding block (CB) meaning an array of samples, that is, a target on which encoding/decoding is to be performed, a coding tree block (CTB) configured with a plurality of coding blocks, a prediction block (PB) (or prediction unit (PU)) meaning an array of samples to which the same prediction is applied, and a transform block (TB) (or transform unit (TU)) meaning an array of samples to which the same transform is applied.

Furthermore, unless described otherwise in this disclosure, a "block" or "unit" may be interpreted as a meaning, including a syntax structure used for a process of encoding/decoding an array of samples for a luma component and/or a chroma component. In this case, the syntax structure means a syntax element of 0 or more which is present in a bitstream as a specific sequence. The syntax element means an element of data represent within the bitstream.

For example, a "block" or "unit" may be interpreted as a meaning, including all of a coding block (CB) and a coding unit (CU) including a syntax structure used for the encoding of and the corresponding coding block (CB), a coding tree unit (CU) configured with a plurality of coding units, a prediction block (PB) and a prediction unit (PU) including a syntax structure used for the prediction of the corresponding prediction block (PB), and a transform block (TB) and a transform unit (TU) including a syntax structure used for the transform of the corresponding transform block (TB).

Furthermore, in this disclosure, a "block" or "unit" is not essentially limited to an array of samples (or picture elements or pixels) having a square or rectangular form, and may mean an array of samples (or picture elements or pixels) of a polygonal form having three vertexes or more. In this case, a "block" or "unit" may also be referred to as a polygon block or polygon unit.

FIG. 1 is an embodiment to which the disclosure is applied, and shows a schematic block diagram of an encoder in which the encoding of a still image or moving image signal is performed.

Referring to FIG. 1, an encoder 100 may include a picture split unit 110, a subtraction unit 115, a transform unit 120, a quantization unit 130, a dequantization (inverse quantization) unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., the inter-prediction unit 181 or intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate the transform coefficients by performing transform using a determined transform scheme depending on a prediction mode applied to the residual block and the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the dequantization unit 140 and the inverse transform unit 150, the residual signal may be reconstructed. By adding the reconstructed residual signal to the prediction signal that is outputted from the inter-prediction unit 181 or the intra-prediction unit 182, a reconstructed signal may be generated.

Meanwhile, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy. In this case, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels as a prediction block.

The intra-prediction unit 182 predicts the current block by referring to the samples adjacent the block that is to be encoded currently. The intra-prediction unit 182 may perform the following procedure in order to perform the intra-prediction. First, the intra-prediction unit 182 may prepare a reference sample that is required for generating a prediction signal. Furthermore, the intra-prediction unit 182 may generate a prediction signal by using the reference sample prepared. After, the intra-prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 is an embodiment to which the disclosure is applied, and shows a schematic block diagram of a decoder in which the encoding of a still image or moving image signal is performed.

Referring to FIG. 2, a decoder 200 may include an entropy decoding unit 210, a dequantization unit 220, an inverse transform unit 230, an addition unit 235, a filtering unit 240, a decoded picture buffer (DPB) 250 and a prediction unit 260. Furthermore, the prediction unit 260 may include an inter-prediction unit 261 and an intra-prediction unit 262.

Furthermore, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 obtains a residual signal (or residual block) by inversely transforming transform coefficients using an inverse transform scheme.

The adder 235 adds the obtained residual signal (or residual block) to the prediction signal (or prediction block) output by the prediction unit 260 (i.e., inter-prediction unit 261 or intra-prediction unit 262), thereby generating a reconstructed signal (or reconstructed block).

The filtering unit 240 applies filtering to the reconstructed signal (or reconstructed block) and outputs it to a playback device or transmits it to the decoding picture buffer unit 250. The filtered signal transmitted to the decoding picture buffer unit 250 may be used as a reference picture in the inter-prediction unit 261.

In this disclosure, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

In general, the block-based image compression method is used in a technique (e.g., HEVC) for compressing a still image or a moving image. A block-based image compression method is a method of processing a video by splitting the video into specific block units, and may decrease the capacity of memory and a computational load.

FIG. 3 is a diagram for illustrating the split structure of a coding unit that may be applied to the disclosure.

The encoder splits a single image (or picture) in a coding tree unit (CTU) of a rectangle form, and sequentially encodes a CTU one by one according to raster scan order.

In HEVC, the size of a CTU may be determined to be one of 64×64, 32×32 and 16×16. The encoder may select and use the size of CTU according to the resolution of an input video or the characteristics of an input video. A CTU includes a coding tree block (CTB) for a luma component and a CTB for two chroma components corresponding to the luma component.

One CTU may be split in a quad-tree structure. That is, one CTU may be split into four units, each having a half horizontal size and half vertical size while having a square form, thereby being capable of generating a coding unit (CU). The split of the quad-tree structure may be recursively performed. That is, a CU is hierarchically from one CTU in a quad-tree structure.

A CU means a basic unit for a processing process of an input video, for example, coding in which intra/inter prediction is performed. A CU includes a coding block (CB) for a luma component and a CB for two chroma components corresponding to the luma component. In HEVC, the size of a CU may be determined to be one of 64×64, 32×32, 16×16 and 8×8.

Referring to FIG. 3, a root node of a quad-tree is related to a CTU. The quad-tree is split until a leaf node is reached, and the leaf node corresponds to a CU.

This is described in more detail. A CTU corresponds to a root node and has the deepest depth (i.e., depth=0) value. A CTU may not be split depending on the characteristics of an input video. In this case, the CTU corresponds to a CU.

A CTU may be split in a quad-tree form. As a result, lower nodes of a depth 1 (depth=1) are generated. Furthermore, a node (i.e., a leaf node) no longer split from the lower node having the depth of 1 corresponds to a CU. For example, in FIG. 3(b), a CU(a), CU(b) and CU(j) corresponding to nodes a, b and j have been once split from a CTU, and have a depth of 1.

At least one of the nodes having the depth of 1 may be split in a quad-tree form again. As a result, lower nodes of a depth 2 (i.e., depth=2) are generated. Furthermore, a node (i.e., leaf node) no longer split from the lower node having the depth of 2 corresponds to a CU. For example, in FIG. 3(b), a CU(c), CU(h) and CU(i) corresponding to nodes c, h and i have been twice split from the CTU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from the lower node having the depth of 3 corresponds to a CU. For example, in FIG. 3(b), a CU(d), CU(e), CU(f) and CU(g) corresponding to nodes d, e, f and g have been split from the CTU three times, and have a depth of 3.

In the encoder, a maximum size or minimum size of a CU may be determined according to the characteristics of a video image (e.g., resolution) or by considering encoding rate. Furthermore, information about the size or information capable of deriving the size may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents the split count and/or degree of a CU, the depth information may include information about the size of a CU.

Since the LCU is split in a quad-tree form, the size of the SCU may be obtained using the size of the LCU and maximum depth information. Alternatively, the size of the LCU may be obtained using the size of the SCU and maximum depth information of a tree.

For a single CU, information (e.g., a split CU flag (split_cu_flag)) indicating whether the corresponding CU is split may be forwarded to the decoder. The split information is included in all of CUs except the SCU. For example, when the value of the flag indicating whether to split is '1', the corresponding CU is further split into four CUs, and when the value of the flag that represents whether to split is '0', the corresponding CU is not split any more, and the processing process for the corresponding CU may be performed.

As described above, the CU is a basic unit of the coding in which the intra-prediction or the inter-prediction is performed. The HEVC splits the CU in a prediction unit (PU) for coding an input video more effectively.

The PU is a basic unit for generating a prediction block, and even in a single CU, the prediction block may be generated in different way by a unit of a PU. However, the intra-prediction and the inter-prediction are not used together for the PUs that belong to a single CU, and the PUs that belong to a single CU are coded by the same prediction method (i.e., intra-prediction or the inter-prediction).

The PU is not split in the Quad-tree structure, but is split once in a single CU in a predetermined form. This will be described by reference to the drawing below.

FIG. 4 is a diagram for illustrating a prediction unit that may be applied to the disclosure.

A PU is differently split depending on whether the intra-prediction mode is used or the inter-prediction mode is used as the coding mode of the CU to which the PU belongs.

FIG. 4(a) illustrates a PU of the case where the intra-prediction mode is used, and FIG. 4(b) illustrates a PU of the case where the inter-prediction mode is used.

Referring to FIG. 4(a), assuming the case where the size of a single CU is 2N×2N (N=4, 8, 16 and 32), a single CU may be split into two types (i.e., 2N×2N or N×N).

In this case, in the case where a single CU is split into the PU of 2N×2N form, it means that only one PU is existed in a single CU.

In contrast, in the case where a single CU is split into the PU of N×N form, a single CU is split into four PUs, and different prediction blocks are generated for each PU unit. However, such a PU split may be performed only in the case where the size of a CB for the luma component of a CU is a minimum size (i.e., if a CU is the SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in intra-prediction, the PU split of N×N form may be performed only in the case where the size of a CB for the luma component of a CU is a minimum size (i.e., if a CU is the SCU).

Inter-prediction supports the PU split of a 2N×N form in the horizontal direction and an N×2N form in the vertical direction.

In addition, the inter-prediction supports the PU split in the form of nL×2N, nR×2N, 2N×nU and 2N×nD, which is asymmetric motion split (AMP). In this case, 'n' means ¼ value of 2N. However, the AMP may not be used in the case where a CU to which a PU belongs is a CU of minimum size.

In order to efficiently encode an input video in a single CTU, the optimal split structure of a coding unit (CU), prediction unit (PU) and transform unit (TU) may be determined based on a minimum rate-distortion value through the processing process as follows. For example, as for the optimal CU split process in a 64×64 CTU, the rate-distortion cost may be calculated through the split process from a CU of a 64×64 size to a CU of an 8×8 size. A detailed process is as follows.

1) The optimal split structure of a PU and TU that generates a minimum rate distortion value is determined by performing inter/intra-prediction, transformation/quantization, dequantization/inverse transformation and entropy encoding on a CU of a 64×64 size.

2) The optimal split structure of a PU and TU is determined by splitting a 64×64 CU into four CUs of a 32×32 size and generating a minimum rate distortion value for each 32×32 CU.

3) The optimal split structure of a PU and TU is determined by further splitting a 32×32 CU into four CUs of a 16×16 size and generating a minimum rate distortion value for each 16×16 CU.

4) The optimal split structure of a PU and TU is determined by further splitting a 16×16 CU into four CUs of an 8×8 size and generating a minimum rate distortion value for each 8×8 CU.

5) The optimal split structure of a CU in a 16×16 block is determined by comparing the rate-distortion value of the 16×16 CU obtained in the process of 3) with the addition of the rate-distortion value of the four 8×8 CUs obtained in the process of 4). This process is also performed on the remaining three 16×16 CUs in the same manner.

6) The optimal split structure of a CU in a 32×32 block is determined by comparing the rate-distortion value of the 32×32 CU obtained in the process of 2) with the addition of the rate-distortion value of the four 16×16 CUs obtained in the process of 5). This process is also performed on the remaining three 32×32 CUs in the same manner.

7) Lastly, the optimal split structure of a CU in a 64×64 block is determined by comparing the rate-distortion value of the 64×64 CU obtained in the process of 1) with the addition of the rate-distortion value of the four 32×32 CUs obtained in the process of 6).

In an intra-prediction mode, a prediction mode is selected in a PU unit, and prediction and reconstruction are performed on the selected prediction mode in an actual TU unit.

A TU means a basic unit by which actual prediction and reconstruction are performed. A TU includes a transform block (TB) for a luma component and two chroma components corresponding to the luma component.

In the example of FIG. 3, as if one CTU is split in a quad-tree structure to generate a CU, a TU is hierarchically split from one CU to be coded in a quad-tree structure.

A TU is split in the quad-tree structure, and a TU split from a CU may be split into smaller lower TUs. In HEVC, the size of a TU may be determined to be any one of 32×32, 16×16, 8×8 and 4×4.

Referring back to FIG. 3, it is assumed that the root node of the quad-tree is related to a CU. The quad-tree is split until a leaf node is reached, and the leaf node corresponds to a TU.

This is described in more detail. A CU corresponds to a root node and has the deepest depth (i.e., depth=0) value. A CU may not be split depending on the characteristics of an input video. In this case, the CU corresponds to a TU.

A CU may be split in a quad-tree form. As a result, lower nodes, that is, a depth 1 (depth=1), are generated. Furthermore, a node (i.e., leaf node) no longer split from the lower node having the depth of 1 corresponds to a TU. For example, in FIG. 3(b), a TU(a), TU(b) and TU(j) corresponding to the nodes a, b and j have been once split from a CU, and have a depth of 1.

At least one of the nodes having the depth of 1 may be split again in a quad-tree form. As a result, lower nodes, that is, a depth 2 (i.e., depth=2), are generated. Furthermore, a node (i.e., leaf node) no longer split from the lower node having the depth of 2 corresponds to a TU. For example, in FIG. 3(b), a TU(c), TU(h) and TU(i) corresponding to the nodes c, h and i have been split twice from the CU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from a lower node having the depth of 3 corresponds to a CU. For example, in FIG. 3(b), a TU(d), TU(e), TU(f), TU(g) corresponding to the nodes d, e, f and g have been split from the CU three times, and have the depth of 3.

A TU having a tree structure may be hierarchically split based on predetermined highest depth information (or highest level information). Furthermore, each split TU may have depth information. The depth information may also include information about the size of the TU because it indicates the number of times and/or degree that the TU has been split.

With respect to one TU, information (e.g., a split TU flag (split_transform_flag)) indicating whether a corresponding TU has been split may be transferred to the decoder. The split information is included in all TUs other than a TU of the least size. For example, if the value of the flag indicating whether a TU has been split is '1', the corresponding TU is split into four TUs. If the value of the flag '0', the corresponding TU is no longer split.

Prediction

In order to reconstruct a current processing unit on which decoding is performed, the decoded part of a current picture including the current processing unit or other pictures may be used.

A picture (slice) using only a current picture for reconstruction, that is, performing only intra-prediction, may be referred to as an intra-picture or I picture (slice). A picture (slice) using the greatest one motion vector and reference index in order to predict each unit may be referred to as a predictive picture or P picture (slice). A picture (slice) using a maximum of two motion vectors and reference indices in order to predict each unit may be referred to as a bi-predictive picture or B picture (slice).

Intra-prediction means a prediction method of deriving a current processing block from a data element (e.g., sample value, etc.) of the same decoded picture (or slice). That is, intra-prediction means a method of predicting a pixel value of the current processing block with reference to reconstructed regions within a current picture.

Inter-prediction means a prediction method of deriving a current processing block based on a data element (e.g., sample value or motion vector) of a picture other than a current picture. That is, inter-prediction means a method of predicting the pixel value of the current processing block with reference to reconstructed regions within another reconstructed picture other than a current picture.

Hereinafter, intra-prediction is described in more detail.

Intra-Prediction

FIG. 5 is an embodiment to which the disclosure is applied and is a diagram illustrating an intra-prediction method.

Referring to FIG. 5, the decoder derives an intra-prediction mode of a current processing block (S501).

In intra-prediction, there may be a prediction direction for the location of a reference sample used for prediction depending on a prediction mode. An intra-prediction mode having a prediction direction is referred to as intra-angular prediction mode "Intra_Angular prediction mode." In contrast, an intra-prediction mode not having a prediction direction includes an intra-planar (INTRA_PLANAR) prediction mode and an intra-DC (INTRA_DC) prediction mode.

Table 1 illustrates intra-prediction modes and associated names, and FIG. 6 illustrates prediction directions according to intra-prediction modes.

TABLE 1

| INTRA PREDICTION MODE | ASSOCIATED NAMES |
| --- | --- |
| 0 | INTRA_PLANAR |
| 1 | INTRA_DC |
| 2 . . . 34 | INTRA_ANGULAR2 . . . INTRA_ANGULAR34 |

In intra-prediction, prediction may be on a current processing block based on a derived prediction mode. A reference sample used for prediction and a detailed prediction method are different depending on a prediction mode. Accordingly, if a current block is encoded in an intra-prediction mode, the decoder derives the prediction mode of a current block in order to perform prediction.

The decoder checks whether neighboring samples of the current processing block may be used for prediction and configures reference samples to be used for prediction (S502).

In intra-prediction, neighboring samples of a current processing block mean a sample neighboring the left boundary of the current processing block of an nS×nS size, a total of 2×nS samples neighboring the left bottom of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been decoded or may not be available. In this case, the decoder may configure reference samples to be used for prediction by substituting unavailable samples with available samples.

The decoder may perform the filtering of the reference samples based on the intra-prediction mode (S503).

Whether the filtering of the reference samples will be performed may be determined based on the size of the current processing block. Furthermore, a method of filtering the reference samples may be determined by a filtering flag transferred by the encoder.

The decoder generates a prediction block for the current processing block based on the intra-prediction mode and the reference samples (S504). That is, the decoder generates the prediction block for the current processing block (i.e., generates a prediction sample) based on the intra-prediction mode derived in the intra-prediction mode derivation step S501 and the reference samples obtained through the reference sample configuration step S502 and the reference sample filtering step S503.

If the current processing block has been encoded in the INTRA_DC mode, in order to minimize the discontinuity of the boundary between processing blocks, at step S504, the left boundary sample of the prediction block (i.e., a sample within the prediction block neighboring the left boundary) and the top boundary sample (i.e., a sample within the prediction block neighboring the top boundary) may be filter.

Furthermore, at step S504, in the vertical mode and horizontal mode of the intra-angular prediction modes, as in the INTRA_DC mode, filtering may be applied to the left boundary sample or the top boundary sample.

This is described in more detail. If the current processing block has been encoded in the vertical mode or the horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for prediction may be much closer than the distance from the reference sample used for prediction.

Accordingly, the decoder may adaptively apply filtering on left boundary samples or top boundary samples depending on whether an intra-prediction direction is a vertical direction or a horizontal direction. That is, the decoder may apply filtering on the left boundary samples if the intra-prediction direction is the vertical direction, and may apply filtering on the top boundary samples if the intra-prediction direction is the horizontal direction.

As described in FIG. 1 and FIG. 2, the encoder/decoder generates a prediction block through an inter prediction (or inter-frame prediction) or an intra prediction (or intra-frame prediction), and generates a residual signal using the original block (or original image) and the prediction block. In this case, the encoder transmits additional information indicating a prediction mode. The decoder generates a prediction block identically with the encoder using the prediction mode received from the encoder, and generates a reconstructed block by adding the prediction block and the residual signal.

In this case, in performing an intra prediction on a chroma image, the encoder/decoder may use a cross-component linear model (CCLM) mode as one of intra prediction modes. The CCLM is a method of predicting a chroma picture element value using a reconstructed luma picture element value, and is a method based on a characteristic that a correlation between a luma image and a chroma image is high.

That is, in general, if the correlation between the luma image and the chroma image is high, the encoder/decoder can improve the accuracy of prediction compared to a conventional chroma intra prediction mode by applying the CCLM mode.

Furthermore, the encoder/decoder may use a linear model (LM) angular prediction (LAP) method (i.e., two prediction methods have been combined) using a conventional chroma intra prediction (e.g., PLANAR, DC, an angular prediction or DM mode) method and a CCLM prediction method at the same time. Such an LAP prediction method is described with reference to the following figure.

FIG. 7 is an embodiment to which the disclosure is applied and is a diagram for describing a method of generating a prediction block of a chroma block using the linear model angular prediction method.

Referring to FIG. 7, the encoder/decoder may generate a first prediction block 703 by performing an angular prediction on a current chroma block. Furthermore, the encoder/decoder may generate a second prediction block 702 by performing a CCLM prediction on the current chroma block.

In this disclosure, in describing the LAP method, for convenience of description, the remaining modes other than a CCLM mode, that is, modes other than a mode in which an inter component prediction is performed, is referred to as an angular prediction mode, a chroma intra prediction mode, a spatial prediction mode or a chroma spatial prediction mode. For example, if the remaining modes except a CCLM mode are referred to as an angular prediction mode (or a chroma intra prediction mode or a spatial prediction mode), the angular prediction mode may include a planar mode, a DC mode, and a DM mode, that is, modes applied to a conventional chroma image encoding technology, in addition to an angular mode in which the direction of a prediction is specified.

The encoder/decoder may generate the final prediction block 701 by combining the first prediction block 703 and the second prediction block 702. For example, the encoder/decoder may generate the final prediction block 701 by averaging the first prediction block 703 and the second prediction block 702. Furthermore, For example, the encoder/decoder may generate the final prediction block 701 using Equation 1.

$$\text{pred}_{LAP}(i,j)=(\text{pred}_{CCLM}(i,j)+\text{pred}_{Angular}(i,j)+1)\gg 1 \quad \text{[Equation 1]}$$

In this case, pred_CCLM indicates a chroma picture element predicted through CCLM, pred_Angular indicates a chroma picture element predicted through an angular prediction, and pred_LAP indicates a chroma picture element finally predicted through the LAP.

In performing an intra prediction on a chroma component, the encoder may determine whether to apply the LAP through rate-distortion optimization (RDO). Furthermore, when the encoder transmits an intra prediction mode for a chroma component, it may additionally transmit, to the decoder, a flag indicating whether to apply the LAP.

A CCLM mode may include a linear model (LM) mode using one linear model, a multi-model linear model (MMLM) mode using a plurality of linear models, and a multi-filter linear model (MFLM) mode using a plurality of down-sampling filters.

As described above, when the LAP mode is applied although various several modes for a CCLM prediction are present, if the CCLM prediction is performed using only a specific mode, compression performance of a chroma image may be degraded.

Accordingly, in order to solve such a problem, the disclosure proposes a method of adaptively selecting a CCLM mode used for the LAP method.

Furthermore, the disclosure proposes a binarization method of a syntax and context modeling method related to the application of the LAP method.

Furthermore, the disclosure proposes a method of applying/changing a weight in applying the LAP method.

Embodiment 1

In an embodiment of the disclosure, the encoder/decoder may adaptively select a CCLM mode used for the LAP method. Specifically, in applying the LAP, the encoder/decoder may adaptively select a mode used for a CCLM prediction among the LM mode or the MMLM mode.

In the LAP method recently being discussed in the image encoding technology, after a CCLM prediction sample is generated for a chroma block using only the MMLM method, the final prediction sample is generated using Equation 1. As described above, in the LAP method that is recently discussed, prediction accuracy may be degraded compared to a case where all the three types which may be used for the CCLM method are used because a CCLM prediction is performed using only one of the MMLM modes.

If image encoding is performed on a chroma image using the CCLM prediction method, the probability that the LM mode and the MMLM mode are selected among the three types of CCLM modes is statistically 85% or more. In this case, the two types of the LM mode and the MMLM mode are selected with a similar probability. Accordingly, the disclosure proposes a method of increasing the accuracy of prediction by considering both the LM mode and the MMLM mode in applying the LAP method.

FIG. 8 is an embodiment to which the disclosure is applied and is a flowchart illustrating a method of generating a prediction block of a chroma block using a linear model angular prediction method.

Referring to FIG. 8, the encoder/decoder generates a first prediction sample by performing a spatial prediction on a current chroma block (S801). For example, if the spatial prediction method is applied, the encoder/decoder may generate a prediction sample using a reference sample neighboring a current chroma block. In this case, a planar mode, a DC mode, a vertical mode, a horizontal mode or a DM mode may be used.

If the spatial prediction is applied to the current chroma block, the encoder/decoder determines whether a combined intra prediction mode is applied to the current chroma block (S802). In this case, the combined intra prediction mode indicates a prediction mode in which a spatial prediction method and an inter component prediction method have been combined. The combined intra prediction mode may be referred to as an LAP mode. Furthermore, as described above, the spatial prediction method indicates the remaining prediction methods except the inter component prediction method (or CCLM prediction method) among intra prediction methods for a chroma image.

If the combined intra prediction mode is applied to the current chroma block, the encoder/decoder determines a component prediction mode (or CCLM prediction mode) used for the inter component prediction of the current chroma block (S803). In this case, the component prediction mode (or CCLM prediction mode) indicates a prediction mode for generating a prediction sample of a chroma component using a sample value of a luma component.

In this case, the encoder/decoder may determine a component prediction mode used for the inter component prediction of the current chroma block among a first prediction mode (i.e., the LM mode) using one linear model or a second prediction mode (i.e., the MMLM mode) using a plurality of linear models.

First, if the first prediction mode is applied to a Cb or Cr chroma block, the encoder/decoder may generate a prediction block of the chroma block using Equation 2.

$$pred_C(i,j) = \alpha \cdot recon_L(2i, 2j) + \beta \qquad [\text{Equation 2}]$$

In this case, pred_C(i,j) indicates a prediction sample of a Cb or Cr chroma component, and recon_L(2i,2j) indicates a reconstructed luma sample. In a 4:2:0 color format, a luma block (or image) may have a size twice the size of a chroma block. Referring to Equation 2, in determining the prediction sample pred_C(i,j) of the chroma component, the encoder/decoder may perform an inter component prediction on the chroma block by considering both the reconstructed sample recon_L(2i,2j) of the luma block and a sample neighboring a corresponding luma block.

Furthermore, in Equation 2, the α, β parameters may be calculated based on a difference between cross-correlations or average values between a peripheral template of the chroma block and a peripheral template of the luma block.

If the second prediction mode is applied to the Cb or Cr chroma block, the encoder/decoder may perform an inter component prediction using two linear models and different α and β parameters. In this case, the encoder/decoder may generate a prediction block of the chroma block using Equation 3.

$$pred_c(i, j) = \begin{cases} \alpha_1 \cdot recon_L(2i, 2j) + \beta_1 & \text{if } recon_L(2i, 2j) > Th \\ \alpha_2 \cdot recon_L(2i, 2j) + \beta_2 & \text{otherwise} \end{cases} \qquad [\text{Equation 3}]$$

Referring to Equation 3, the encoder/decoder may obtain a threshold for classifying luma samples into two groups based on a sample value of a peripheral template of the luma block corresponding to the chroma block. Thereafter, the encoder/decoder may classify the luma samples into the two groups based on the obtained threshold, and may calculate two types of α, β parameter values (i.e., $\alpha\_1, \beta\_1, \alpha\_2, \beta\_2$) for each group using only a corresponding group picture element. That is, the encoder/decoder may classify a value of a luma sample, corresponding to the chroma block, based on the obtained threshold, and may perform an inter component prediction using the α, β values determined for each group.

In one embodiment, when the size of the current chroma block is greater than a predetermined size, the encoder/decoder may determine a component prediction mode among the first prediction mode or the second prediction mode. For example, when the sum of the width and height of the current chroma block is less than 11 (i.e., the current chroma block is a 2×2, 2×4, 4×2, 2×8, 8×2 or 4×4 block), the encoder/decoder may select (or determine) only the MMLM mode as a component prediction mode. In contrast, when the sum of the width and height of the current chroma block is 11 or more, the encoder may select one of the first prediction mode or the second prediction mode through RDO, and may signal the selected mode information to the decoder.

The encoder may determine a component prediction mode applied to the current chroma block, among the first prediction mode or the second prediction mode, through RDO, and may transmit the determined mode information to the decoder. Furthermore, the decoder may extract an index indicating a specific mode, among the first prediction mode or the second prediction mode, from a bitstream received from the encoder.

If a component prediction mode of the two modes is determined only when the current chroma block is greater than a predetermined size, the decoder may first identify whether the current chroma block is greater than the predetermined size, and may extract an index indicating a mode applied to the current chroma block if, as a result of the identification, the current chroma block is greater than the predetermined size.

The encoder/decoder generates a second prediction sample by applying the component prediction mode, determined at step S803, to the current chroma block (S804). In this case, the encoder/decoder may generate a second prediction sample of the current chroma block using Equation 2 or 3 according to the determined component prediction mode.

The encoder/decoder generates the final prediction sample of the current chroma block using the first prediction sample and the second prediction sample (S805).

For example, as described in Equation 1, the encoder/decoder may generate the final prediction sample by averaging the first prediction sample and the second prediction sample.

If any one of the LM method and the MMLM method is selected for a CCLM prediction, the encoder may signal the selected CCLM prediction mode to the decoder as in the example of Table 2.

TABLE 2

| LAP off | 0 | |
|---|---|---|
| LAP with MMLM | 1 | 0 |
| LAP with LM | 1 | 1 |

As illustrated in Table 2, the encoder/decoder may perform binarization on prediction mode information applied to the intra prediction of a chroma block. Specifically, 1 bit may be assigned to a flag (hereinafter referred to as an "LAP flag") for indicating whether the LAP method is applied. Thereafter, if the LAP method is applied (i.e., when the LAP flag value is 1), 1 bit may be assigned to an index (hereinafter referred to as a "CCLM index") for indicating a CCLM prediction mode. The CCLM index indicates an index (or flag) for indicating any one of the LM mode and the MMLM method for a CCLM prediction. When the CCLM index value is 0, it may indicate the MMLM mode. When the CCLM value is 1, it may indicate the LM mode.

In one embodiment of the disclosure, the encoder/decoder may assign plurality of context models to an LAP flag.

In general, if the LAP method is applied to a peripheral block, such as the top block or left block of a current chroma block, the probability that a current block LAP may be selected is high. Accordingly, a probability distribution of LAP flags can be effectively adjusted in corresponding context by separately defining the context in which such a case is considered. That is, a signaling bit saving effect for an LAP flag can be obtained when context-based adaptive binary arithmetic coding (CABAC) is performed by determining the context based on whether the LAP method is applied to a peripheral block.

If the LAP is applied to all peripheral blocks, the encoder/decoder may separately use context in which such a case is considered because the probability that the LAP will be applied to a current block is relatively high. Likewise, if the LAP is not applied to all of peripheral blocks, the probability that the LAP will be applied to a current block is relatively low. In such a case, a similar signaling bit saving effect can be obtained using context different from the above case.

That is, the encoder/decoder may determine a context model of the LAP flag of a current block depending on whether the LAP is applied to a peripheral block. For example, the encoder/decoder may assign a context model to an LAP flag and CCLM index as in the example of Table 3.

TABLE 3

| | Context model 0, 1, 2 | Context model 3 |
|---|---|---|
| LAP off | 0 | |
| LAP with MMLM | 1 | 0 |
| LAP with LM | 1 | 1 |

Referring to Table 3, the encoder/decoder may use three context models (i.e., the context models 0 to 2) for an LAP flag, and may use one context model (i.e., the context model 3) for a CCLM index.

For example, the encoder/decoder may select the context model of the LAP flag of a current block among the three context models based on whether the LAP is applied to a peripheral block. Specifically, the encoder/decoder may determine a context model of the LAP flag of a current block using the following method.

If the top block of a current block is present and the LAP is applied to the top block, the encoder/decoder may increase the number (or value) of context models by 1.

If the left block of a current block is present and the LAP is applied to the left block, the encoder/decoder may increase the number of context models by 1.

Furthermore, the encoder/decoder may previously set a context initial value based on the number of context models as in the example of Table 4.

TABLE 4

| | Context model 0 | Context model 1 | Context model 2 | Context model 3 |
|---|---|---|---|---|
| Example1 | 63 | 139 | 139 | 154 |

Referring to Table 4, in the example of the context model 0, an initial value 63 indicates that the probability that 0 or 1 will be selected is 50%. The probability may be changed based on a quantization parameter (QP). Furthermore, in the example of the context model 3, the initial value 154 indicates a case where the probability that 0 or 1 will be selected is 50%, and has a fixed probability value regardless of QP. In the examples of the context models 1 and 2, the initial value 139 indicates a case where an initial probability that 1 will be selected is 55%, and the probability may be changed based on a QP.

In the LAP mode, the signaling of additional flag information is necessary, and the probability that 0 or 1 will be selected in a higher QP is present because an elaborate prediction is performed. Accordingly, the encoder/decoder may set the initial value in the context models 0 to 2 so that the probability can be changed based on the QP as in the example 1 of Table 3. Furthermore, in the case of the context model 1, 2, entropy coding efficiency can be improved using an initial value whose selection probability is 55% because there is a block to which the LAP mode is applied among peripheral blocks. Meanwhile, in the case of the context model 3, the encoder/decoder may set the initial value regardless of the QP because the context model 3 corresponds to a flag indicating the LM mode or the MFLM mode.

In one embodiment, the encoder/decoder may adaptively apply the LAP method based on a condition, such as the following example.

The encoder/decoder may apply the LAP method only when the size of a current chroma block is a predetermined size or more or less, and may select a CCLM mode when applying the LAP method. For example, the encoder/decoder may set the LAP method to be applied only when the sum of the width and height of a chroma block is 7 or more. Furthermore, the encoder/decoder may set a CCLM mode to be selected among the LM mode or the MFLM mode when applying the LAP method only when the sum of the width and height of a chroma block is 23 or more. When the sum of the width and height of a current chroma block is 7 or more to less than 23, the encoder/decoder selects the LAP method so that it is applied to the current chroma block, but may set only the LM mode to be applied as a CCLM mode.

The encoder/decoder may select a CCLM mode when adaptively applying the LAP method based on a prediction mode of a current chroma block. For example, the encoder/decoder may set a CCLM mode to be selected among the LM mode or the MFLM mode when applying the LAP method only in a case where a prediction mode of a current chroma block is a mode other than a DC mode or a planar mode. Meanwhile, if a prediction mode of the current chroma block is the DC mode or planar mode, the encoder/decoder may set only the MMLM mode to be used as a CCLM mode.

The encoder/decoder may select a CCLM mode when adaptively applying the LAP method to the sequence (or number) of a prediction mode of a current chroma block. For example, the encoder/decoder may set a CCLM mode to be selected among the LM mode or the MFLM mode when applying the LAP method only when the mode sequence of a current chroma block is No. 3 or less. When the mode sequence of the current chroma block is greater than No. 3 (or or more), the encoder/decoder may set only the MMLM mode to be applied as a CCLM mode.

As in the present embodiment, if context modeling is performed as in the examples of Table 2 and Table 3 by considering both the LM mode and the MMLM mode when the LAP method is applied, encoding performance improvement results, such as Table 5, can be obtained compared to the LAP method using only the MMLM mode for a CCLM prediction.

TABLE 5

|  | Y | U | V |
|---|---|---|---|
| Class A1 | 0.02% | −0.42% | −0.44% |
| Class A2 | 0.01% | −0.72% | −0.45% |
| Class B | 0.05% | −0.65% | −0.83% |
| Class C | 0.04% | −0.72% | −1.47% |
| Class D | −0.08% | −1.49% | 0.53% |
| Class E | −0.16% | −0.50% | 0.56% |
| All | −0.01% | −0.75% | −0.41% |

In Table 5, a case where the sum of the width and height of a current chroma block is less than 11 is assumed. Referring to Table 5, in such simulations, an anchor is software that implements the LAP method in JEM 5.0.1. Table 5 shows the results of a comparison between algorithms proposed and implemented in the disclosure based on the software. Both the anchor and the comparison software were compared based on an all-intra configuration and 10 frames, and detailed settings are based on JEM common test setting.

By applying the method proposed in the disclosure, a Bjontegaard delta rate (BD-rate) gain of 0.01% can be obtained in the case of a luma component and BD-Rate gains of 0.75% and 0.41% can be obtained in the case of chroma components of Cb and Cr, respectively, as in Table 4.

Embodiment 2

In an embodiment of the disclosure, the encoder/decoder may apply a weight to a block generated by an inter component prediction and a block generated by a spatial prediction in applying the LAP method. Furthermore, the encoder/decoder may adaptively determine (or select) a weight applied to each of the block generated by the inter component prediction and the block generated by the spatial prediction.

In Embodiment 1, a case where an average value of a prediction block generated by an inter component prediction and a block generated by a spatial prediction is determined (or used) as the final prediction block has been described, but prediction blocks generated through the inter component prediction and the spatial prediction have inevitably different accuracy of prediction. Accordingly, the present embodiment proposes a method of applying a weight to each prediction block in order to consider a deviation of prediction accuracy occurring between the two prediction methods when the LAP method is applied.

For example, the encoder/decoder may set a weight applied to each prediction block like Equation 4 or 5.

$$\text{pred}_{LAP}(i,j)=(3\times\text{pred}_{CCLM}(i,j)+\text{pred}_{Angular}(i,j)+2)\gg 2 \quad \text{[Equation 4]}$$

Referring to Equation 4, pred_CCLM indicates a chroma sample predicted through an inter component prediction. pred_Angular indicates a chroma sample predicted through an angular prediction (i.e., spatial prediction). pred_LAP indicates a chroma sample finally predicted through the LAP. The encoder/decoder may generate the final prediction sample by applying a higher weight to a prediction sample generated through the inter component prediction.

$$\text{pred}_{LAP}(i,j)=(\text{pred}_{CCLM}(i,j)+3\times\text{pred}_{Angular}(i,j)+2)\gg 2 \quad \text{[Equation 5]}$$

In contrast, referring to Equation 5, the encoder/decoder may generate the final prediction sample by applying a higher weight to a prediction sample generated through an angular prediction. If a weight is applied as in Equation 4 and Equation 5, the final prediction sample into which the weight has been incorporated with low calculation complexity can be generated by generating the final prediction sample through a shift operation while applying a higher weight to a prediction sample having relatively high accuracy of prediction. The encoder may select an optimal weight through RDO, and may signal, to the decoder, information related to the weight like Table 6.

TABLE 6

| LAP off | 0 | |
|---|---|---|
| LAP with equation(1) | 1 | 0 |
| LAP with equation(4) | 1 | 1 |

As illustrated in Table 6, the encoder/decoder may perform binarization on prediction mode information applied to the intra prediction of a chroma block. Specifically, 1 bit may be assigned to an LAP flag. Thereafter, when an LAP flag value is 1, 1 bit may be assigned to an index (hereinafter referred to as an "LAP weight index") for signaling weight information applied to the LAP. In this case, when an LAP weight index value is 0, the encoder/decoder may use an average value as described in Equation 1 in order to generate the final prediction sample. When an LAP weight index value is 1, the encoder/decoder may apply a higher weight to an inter component prediction as described in Equation 4 in order to generate the final prediction sample. For another example, unlike in that shown in Table 6, the encoder/decoder may apply a higher weight to a spatial prediction, as described in Equation 5.

Furthermore, in one embodiment, as illustrated in Table 7, the encoder/decoder may perform binarization on prediction mode information applied to the intra prediction of a chroma block.

TABLE 7

| | | |
|---|---|---|
| LAP off | 0 | 0 |
| LAP with equation(1) | 0 | 1 |
| LAP with equation(4) | 1 | 0 |
| LAP with equation(5) | 1 | 1 |

Referring to Table 7, the encoder/decoder may perform binarization by combining information indicating whether to apply the LAP and weight information. That is, when the LAP-related syntax indicates "00", the encoder/decoder may not apply the LAP. When the LAP-related syntax indicates "01", the encoder/decoder applies the LAP to a current chroma block, but may use an average value as in Equation 1. When the LAP-related syntax indicates "10", the encoder/decoder applies the LAP to a current chroma block $^0$-|| LAP, but may apply a higher weight to an inter component prediction as described in Equation 4. When the LAP-related syntax indicates "11", the encoder/decoder applies the LAP to a current chroma block, but may apply a higher weight to a spatial prediction, as described in Equation 5.

In one embodiment of the disclosure, in applying the LAP method, the encoder/decoder may adaptively determine a weight based on a distance from a peripheral reference sample used based on a prediction direction.

When the LAP is applied, a prediction mode used for a spatial prediction may be an angular prediction mode. In this case, the accuracy of prediction may be higher as the distance between a reference sample used for the generation of a prediction sample and a current sample becomes close depending on a prediction direction, and the accuracy of prediction may be lower as the distance becomes distant. Accordingly, the encoder/decoder may adaptively determine a weight based on the distance between a current sample (or prediction sample) and a reference sample used for a prediction. For example, the encoder/decoder may generate the final prediction sample by applying a weight determined based on a distance from a reference sample, as in Equation 6.

$$pred_{LAP}(i,j)=((1-w) \times pred_{CCLM}(i,j)+w \times pred_{Angular}(i,j))$$ [Equation 6]

In this case, w indicates a weight which may be determined based on the distance. The encoder/decoder may set a w value so that it is proportional to or inversely proportional to a distance from a prediction sample. Accordingly, a higher weight may be assigned to a spatially predicted (or angular-predicted) block of a current sample having a relatively close distance from a reference sample.

FIG. 9 is an embodiment to which the disclosure is applied and is a diagram illustrating a method of adaptively determining a weight, applied to a linear model angular prediction method, based on a distance between a prediction sample and a reference sample.

Referring to FIG. 9, a case where a prediction mode used for a spatial prediction is a vertical mode and the size of a current chroma block is 8×8 is assumed. Since the prediction direction is vertical, reference samples neighboring the top of the current chroma block may be used for a prediction. In this case, the encoder/decoder may perform the LAP by applying a relatively high weight to samples located at the top within the current chroma block, and may perform the LAP by applying a relatively low weight to samples located at the bottom within the current chroma block.

Specifically, as illustrated in FIG. 9, the encoder/decoder may divide a current chroma block into four sub-areas in a direction vertical to a current prediction direction. Furthermore, the sub-areas may be set as weight values 0.8, 0.6, 0.4, and 0.2, respectively, in the sequence of a distance from a reference sample used for a prediction.

According to the present embodiment, the accuracy of prediction varying depending on a distance from a reference sample can be effectively incorporated, and compression efficiency of the LAP method can be improved.

In one embodiment, the encoder/decoder may adaptively apply the LAP based on a condition, such as the following example.

The encoder/decoder may apply the LAP method only when the size of a current chroma block is a predetermined size or more or less, and may select a CCLM mode when applying the LAP method. For example, the encoder/decoder may set the LAP method to be applied only when the sum of the width and height of a chroma block is 7 or more. Furthermore, the encoder/decoder may set a CCLM mode to be selected among the LM mode or the MFLM mode when applying the LAP method only if the sum of the width and height of a chroma block is 23 or more. The encoder/decoder selects the LAP method so that can be applied to a current chroma block only when the sum of the width and height of the current chroma block is 7 or more to less than 23, but may set only the LM mode to be applied as the CCLM mode.

The encoder/decoder may select a CCLM mode when adaptively applying the LAP method based on a prediction mode of a current chroma block. For example, the encoder/decoder may set a CCLM mode to be selected among the LM mode or the MFLM mode when applying the LAP method only if a prediction mode of a current chroma block is a mode other than a DC mode or a planar mode. Meanwhile, if a prediction mode of the current chroma block is a DC mode or a planar mode, the encoder/decoder may set only the MMLM mode to be applied as a CCLM mode.

The encoder/decoder may select a CCLM mode when adaptively applying the LAP method to the sequence (or number) of a prediction mode of a current chroma block. For example, the encoder/decoder may set a CCLM mode to be selected among the LM mode or the MFLM mode when applying the LAP method only if the mode sequence of a current chroma block is No. 3 or less. If the mode sequence of the current chroma block is greater than No. 3 (or or more), the encoder/decoder may set only the MMLM mode to be applied as the CCLM mode.

Embodiment 3

In an embodiment of the disclosure, the encoder/decoder may select a CCLM mode used for the LAP method, and may adaptively determine a weight applied to the LAP method. That is, the encoder/decoder may perform the LAP by combining Embodiment 1 and Embodiment 2.

In applying the LAP, the encoder/decoder may select a mode used for a CCLM prediction, among the LM mode or the MMLM mode. Furthermore, in applying the LAP method, the encoder/decoder may apply a weight to a block generated by an inter component prediction and a block generated by a spatial prediction. In this case, the encoder/decoder may perform binarization on LAP-related information as in Table 8.

TABLE 8

| | | | | |
|---|---|---|---|---|
| LAP off | 0 | | | |
| LAP with MMLM and equation(1) | 1 | 0 | | |
| LAP with LM and equation(1) | 1 | 1 | 0 | |
| LAP with MMLM and equation(4) | 1 | 1 | 1 | 0 |
| LAP with LM and equation(4) | 1 | 1 | 1 | 1 |

Referring to Table 8, the encoder/decoder may perform binarization by combining information indicating whether to apply the LAP, information indicating a CCLM mode, and weight-related information (hereinafter generally referred to as an "LAP-related syntax"). When the LAP-related syntax indicates "0", the encoder/decoder may not apply the LAP to a current chroma block.

When the LAP-related syntax indicates "10", the encoder/decoder applies the LAP to a current chroma block and performs a CCLM prediction using the MMLM mode, but may generate the final prediction block using an average value as in Equation 1.

When the LAP-related syntax indicates "110", the encoder/decoder applies the LAP to a current chroma block and performs a CCLM prediction using the LM mode, but may generate the final prediction block using an average value as in Equation 1.

When the LAP-related syntax indicates "1110", the encoder/decoder applies the LAP to a current chroma block and performs a CCLM prediction using the MMLM mode, but may apply a higher weight to an inter component prediction as described in Equation 4. For another example, unlike in that shown in Table 6, the encoder/decoder may apply a higher weight to a spatial prediction as described in Equation 5.

When the LAP-related syntax indicates "1111", the encoder/decoder may apply the LAP to a current chroma block and performs a CCLM prediction using the LM mode, but may apply a higher weight to an inter component prediction as described in Equation 4. For another example, unlike in that shown in Table 6, the encoder/decoder may apply a higher weight to a spatial prediction as described in Equation 5.

In another embodiment, the encoder/decoder may perform binarization on LAP-related information like Table 9.

TABLE 9

| | | |
|---|---|---|
| LAP off | 0 | 0 |
| LAP with MMLM and equation(1) | 0 | 1 |
| LAP with LM and equation(1) | 1 | 0 |
| LAP with MMLM and equation(4) | 1 | 1 |

Referring to Table 9, the encoder/decoder may perform binarization by combining information indicating whether to apply the LAP, information indicating a CCLM mode, and weight-related information (hereinafter generally referred to as an "LAP-related syntax"). When the LAP-related syntax indicates "00", the encoder/decoder may not apply the LAP to a current chroma block.

When the LAP-related syntax indicates "01", the encoder/decoder applies the LAP to a current chroma block and performs a CCLM prediction using the MMLM mode, but may generate the final prediction block using an average value as in Equation 1.

When the LAP-related syntax indicates "10", the encoder/decoder applies the LAP to a current chroma block and performs a CCLM prediction using the LM mode, but may generate the final prediction block using an average value as in Equation 1.

When the LAP-related syntax indicates "11", the encoder/decoder applies the LAP to a current chroma block and performs a CCLM prediction using the MMLM mode, but may apply a higher weight to an inter component prediction as described in Equation 4. For another example, unlike in that shown in Table 6, the encoder/decoder may apply a higher weight to a spatial prediction as described in Equation 5.

In one embodiment, the encoder/decoder may adaptively apply the LAP based on a condition, such as the following example.

The encoder/decoder may apply the LAP method only when the size of a current chroma block is a predetermined size or more or less, and may select a CCLM mode when applying the LAP method. For example, the encoder/decoder may set the LAP method to be applied only when the sum of the width and height of a chroma block is 7 or more. Furthermore, the encoder/decoder may set a CCLM mode to be selected among the LM mode or the MFLM mode when applying the LAP method only if the sum of the width and height of a chroma block is 23 or more. The encoder/decoder selects the LAP method so that can be applied to a current chroma block only when the sum of the width and height of the current chroma block is 7 or more to less than 23, but may set only the LM mode to be applied as the CCLM mode.

The encoder/decoder may select a CCLM mode when adaptively applying the LAP method based on a prediction mode of a current chroma block. For example, the encoder/decoder may set a CCLM mode to be selected among the LM mode or the MFLM mode when applying the LAP method only if a prediction mode of a current chroma block is a mode other than a DC mode or a planar mode. Meanwhile, if a prediction mode of the current chroma block is a DC mode or a planar mode, the encoder/decoder may set only the MMLM mode to be applied as a CCLM mode.

The encoder/decoder may select a CCLM mode when adaptively applying the LAP method to the sequence (or number) of a prediction mode of a current chroma block. For example, the encoder/decoder may set a CCLM mode to be selected among the LM mode or the MFLM mode when applying the LAP method only if the mode sequence of a current chroma block is No. 3 or less. If the mode sequence of the current chroma block is greater than No. 3 (or or more), the encoder/decoder may set only the MMLM mode to be applied as the CCLM mode.

FIG. 10 is a diagram more specifically illustrating an intra prediction unit according to an embodiment of the disclosure.

In FIG. 10, the intra prediction unit 182 (refer to FIG. 1) or 262 (refer to FIG. 2) has been illustrated as a single block, but the intra prediction unit 182, 262 may be implemented as an element included in the encoder and/or the decoder, for convenience of description.

Referring to FIG. 10, the intra prediction unit 182, 262 implements the functions, processes and/or methods proposed in FIGS. 5 to 9. Specifically, the intra prediction unit 182, 262 may be configured with a first prediction sample generation unit 1001, a combined intra prediction mode determination unit 1002, a component prediction mode determination unit 1003, a second prediction sample generation unit 1004 and a final prediction block generation unit 1005.

The first prediction sample generation unit 1001 generates a first prediction sample by performing a spatial prediction on a current chroma block. For example, if a spatial prediction method is applied, the first prediction sample generation unit 1001 may generate a prediction sample a reference sample neighboring a current chroma block. In this case, a planar mode, a DC mode, a vertical mode, a horizontal mode or a DM mode may be used.

The combined intra prediction mode determination unit 1002 determines whether a combined intra prediction mode is applied to a current chroma block. In this case, the combined intra prediction mode indicates a prediction mode in which a spatial prediction method and an inter component prediction method have been combined. The combined intra prediction mode may be referred to as the LAP mode. Furthermore, as described above, the spatial prediction method indicates the remaining prediction methods except an inter component prediction method (or CCLM prediction method) among intra prediction methods of a chroma image.

If the combined intra prediction mode is applied to a current chroma block, the component prediction mode determination unit 1003 determines a component prediction mode (or a CCLM prediction mode) used for the inter component prediction of the current chroma block. In this case, the component prediction mode indicates a prediction mode that generates a prediction sample of a chroma component using a sample value of a luma component.

The second prediction sample generation unit 1004 generates a second prediction sample by applying, to the current chroma block, the component prediction mode determined by the component prediction mode determination unit 1003. In this case, the second prediction sample generation unit 1004 may generate the second prediction sample of the current chroma block by applying the method described in FIG. 8 based on the determined component prediction mode.

The final prediction block generation unit 1005 generates the final prediction sample of the current chroma block using the first prediction sample and the second prediction sample.

For example, as described in Equation 1, the encoder/decoder may generate the final prediction sample by averaging the first prediction sample and the second prediction sample. Or, for example, the final prediction block generation unit 1005 may apply a weight to the first prediction sample and the second prediction sample, as described in Embodiment 2 or Embodiment 3.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative from all aspects, but should be construed as being illustrative. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method of processing an image based on an intra prediction mode, the method comprising:
generating a first prediction sample by performing a spatial prediction on a current chroma block;
determining whether a combined intra prediction mode is applied to the current chroma block, wherein the combined intra prediction mode indicates a prediction mode in which a spatial prediction method and an inter component prediction method have been combined;
determining a component prediction mode used for an inter component prediction of the current chroma block when the combined intra prediction mode is applied to the current chroma block, wherein the component prediction mode indicates a prediction mode for generating a prediction sample of a chroma component using a sample value of a luma component;
generating a second prediction sample by applying the determined component prediction mode to the current chroma block; and
generating a final prediction sample of the current chroma block using the first prediction sample and the second prediction sample.

2. The method of claim 1,
wherein determining the component prediction mode comprises determining the component prediction mode among a first prediction mode using one linear model or a second prediction mode using a plurality of linear models.

3. The method of claim 2,
wherein generating the second prediction sample comprises generating the second prediction sample using a reconstructed sample of a luma block corresponding to the current chroma block when the determined component prediction mode is the first prediction mode.

4. The method of claim 2,
wherein generating the second prediction sample comprises classifying reconstructed samples of a luma block, corresponding to the current chroma block, into two groups when the determined component prediction mode is the second prediction mode, and
wherein the second prediction sample is generated using a reconstructed sample of a luma block corresponding to the current chroma block in the classified group unit.

5. The method of claim 4,
wherein classifying the reconstructed samples into the two groups comprises deriving a threshold using neighbor samples of a luma block corresponding to the current chroma block, and
wherein the reconstructed samples of the luma block are classified into the two groups based on the derived threshold.

6. The method of claim 1,
wherein determining the component prediction mode comprises extracting an index indicating a specific mode among the first prediction mode or the second prediction mode.

7. The method of claim 6,
wherein extracting the index indicating the specific mode comprises identifying whether the current chroma block is greater than a predetermined size, and
wherein the index indicating the specific mode is extracted when the current chroma block is greater than the predetermined size as a result of the identification.

8. The method of claim 1,
wherein determining whether the combined intra prediction mode is applied comprises extracting a combined intra prediction flag indicating whether the combined intra prediction mode is applied to the current chroma block, and
wherein a plurality of context models is assigned to the combined intra prediction flag.

9. The method of claim 8,
wherein a context model of the combined intra prediction flag is determined based on whether the combined intra prediction mode is applied to a block neighboring the current chroma block.

10. The method of claim 1,
wherein generating the final prediction sample comprises generating the final prediction sample by applying predetermined weights to the first prediction sample and the second prediction sample.

11. The method of claim 1,
wherein generating the final prediction sample comprises determining a weight applied to each of the first prediction sample and the second prediction sample, and
wherein the final prediction sample is generated by applying the determined weights to the first prediction sample and the second prediction sample.

12. The method of claim 11,
wherein generating the final prediction sample comprises extracting an index indicating a specific weight among a plurality of predetermined weights.

13. The method of claim 11,
wherein the weights applied to the first prediction sample and the second prediction sample are determined based on a prediction direction of a prediction mode used for the spatial prediction and a distance between a reference sample neighboring the current chroma block and a sample within the current chroma block.

14. An apparatus for processing an image based on an intra prediction mode, the apparatus comprising:
a first prediction sample generation unit configured to generate a first prediction sample by performing a spatial prediction on a current chroma block;
a combined intra prediction mode determination unit configured to determine whether a combined intra prediction mode is applied to the current chroma block, wherein the combined intra prediction mode indicates a prediction mode in which a spatial prediction method and an inter component prediction method have been combined;
a component prediction mode determination unit configured to determine a component prediction mode used for an inter component prediction of the current chroma block when the combined intra prediction mode is applied to the current chroma block, wherein the component prediction mode indicates a prediction mode for generating a prediction sample of a chroma component using a sample value of a luma component;
a second prediction sample generation unit configured to generate a second prediction sample by applying the determined component prediction mode to the current chroma block; and
a final prediction sample generation unit configured to generate a final prediction sample of the current chroma block using the first prediction sample and the second prediction sample.

* * * * *